(No Model.)
J. H. CORCORAN.
MACHINE FOR WINDING OR STRETCHING FENCE WIRE.
No. 344,629. Patented June 29, 1886.
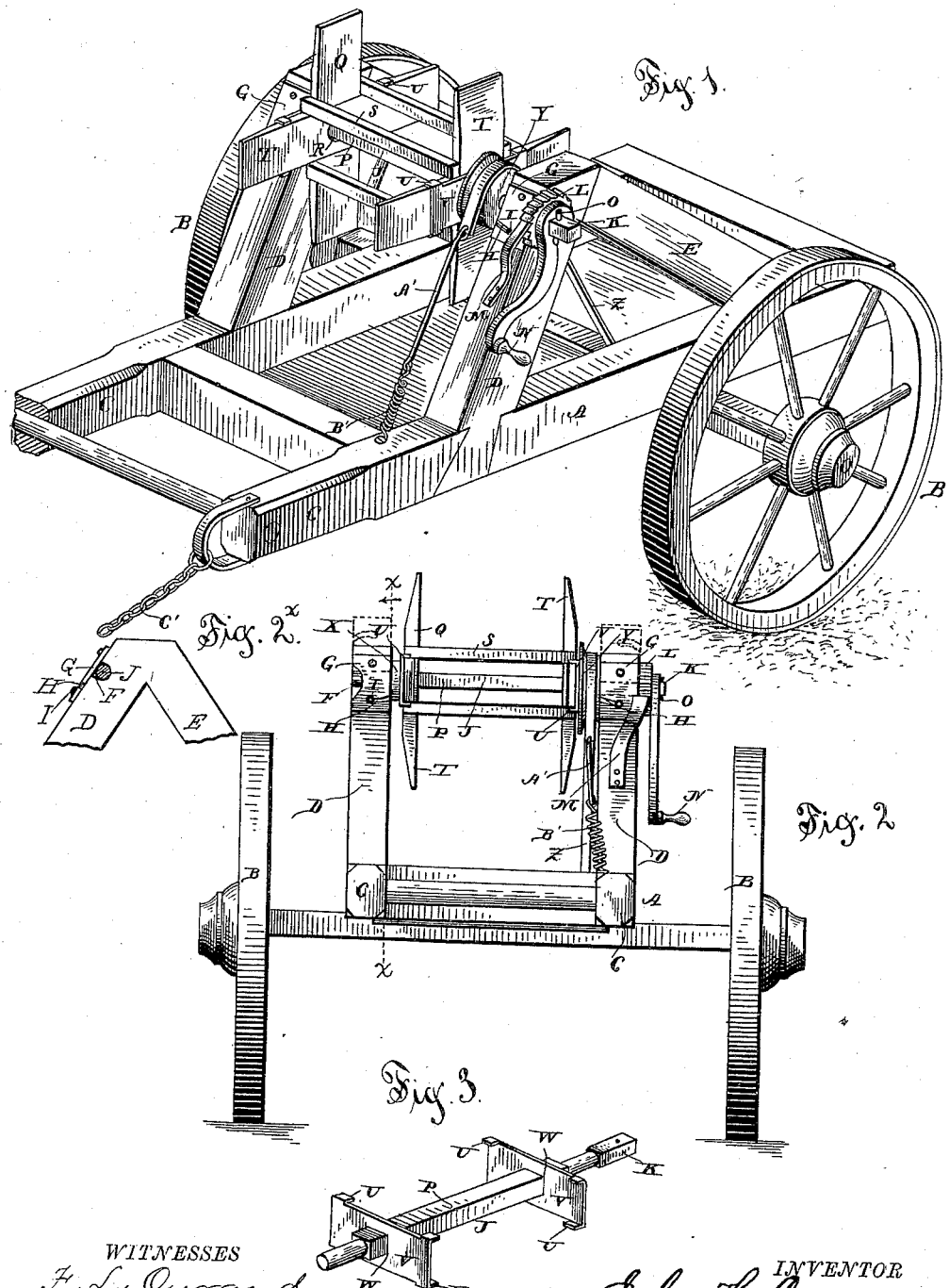
WITNESSES
F. L. Durand
Edward Stanton
INVENTOR
John H. Corcoran
By Louis Bagger & Co.
Attorneys

United States Patent Office.

JOHN HUFF CORCORAN, OF OAKLAND VALLEY, IOWA.

MACHINE FOR WINDING OR STRETCHING FENCE-WIRE.

SPECIFICATION forming part of Letters Patent No. 344,629, dated June 29, 1886.

Application filed March 31, 1886. Serial No. 197,252. (No model.)

*To all whom it may concern:*

Be it known that I, JOHN HUFF CORCORAN, a citizen of the United States, and a resident of Oakland Valley, in the county of Franklin and State of Iowa, have invented certain new and useful Improvements in Machines for Winding or Stretching Fence-Wire; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved machine for winding, unwinding, and tightening fence-wire. Fig. 2 is a front view of the same, and Fig. $2^x$ is a sectional view taken on line $x$ $x$, showing the manner of journaling the spool-carrying shaft; and Fig. 3 is a perspective detail view of the shaft and its means for fastening the reel or spool.

Similar letters of reference indicate corresponding parts in all the figures.

My invention has relation to machines for winding or unwinding fence-wire upon or from spools in taking down or building wire fences; and it consists in the improved construction and combination of parts of a machine which may be transported along the line of the fence, and either unwind wire from a spool in building the fence or wind it upon a spool in taking down the fence, and which likewise may be used as a wire-tightener, as hereinafter more fully described and claimed.

In the accompanying drawings, the letter A indicates a frame, which is mounted upon wheels B B, and provided with short shafts C C at the forward end, by means of which the frame may be drawn either directly or by attaching them to the rear end of a vehicle. Two pairs of uprights, D D and E E, project obliquely from the forward and rear ends of the side pieces of the frame, and are secured to each other at the upper ends, and the upper ends of the forward pair of uprights are formed with bearings F, which are open at the outer sides and covered by the pivoted bars or plates G, which may swing over them and close them, being pivoted at their upper ends and sliding with the obliquely-transverse slots H upon the ends of pins I, projecting from the faces of the uprights below the bearings. The round ends of a shaft, J, are journaled in these bearings, and one end, K, of the shaft projects out beyond the bearing and is polygonal, and provided with a ratchet-wheel, L, which is engaged by a spring-pawl, M, upon the upright, and with a crank, N, by means of which the shaft may be revolved.

The crank and ratchet-wheel are preferably made in one piece and fit removably upon the polygonal end of the shaft, having a correspondingly-shaped perforation at the center, and the crank and wheel are secured upon the shaft by means of a key or pin, O, inserted through a perforation in the end of the shaft outside of the crank and wheel. The central portion of the shaft is square, as shown at P, and an ordinary wire spool or reel, Q, fits upon the square portion of the shaft, said spool generally having round perforations R in its ends. This spool or reel is of the shape usually found in spools for fence-wire, having cross-shaped end pieces, T, and strips S, connecting the said end pieces; and for the purpose of revolving the spool with the shaft one piece of each cross-shaped end piece is engaged at its edges by inwardly-projecting lips U, which project from the edges of the outer ends of plates V, which fit, with their square central perforations, W, upon the square portion of the shaft, bearing with their inner faces against the outer faces of the pieces of the ends of the spool and having the inwardly-projecting ends clamping the edges of the said pieces.

The plates are secured upon the shaft by means of a washer, X, having a square perforation, and fitting between the plate and the inner side of one bearing, and a flanged disk, Y, which fits between the other plate and the bearing in which the end having the crank is journaled, the said disk having likewise a square perforation, and this disk and the washer bear with their outer sides against the inner sides of the bearings, and with their inner sides against the plates, forcing the plates to engage the ends of the spool with their lips.

The flanged disk Y performs an office similar to that of the washer X, and at the same time acts as a brake-wheel, its flange preventing the brake-strap from rubbing against the plate V.

A metallic strap, Z, or strap of a strong flexible material, is secured to the frame of the machine and passes over the disk upon the shaft, and a rod, A', secured at its lower end to a spring, B', upon the frame, is secured to the other end of the strap, the spring holding the strap against the edge of the disk to act as a brake.

A chain, C', may be secured to the frame and to a post in the line of the fence, for the purpose of retaining the carriage when the machine is used as a wire-stretcher.

When the machine is to be used either for unwinding wire in making a fence or for winding wire in taking a fence down, the spool for the wire is placed upon the shaft, the securing-plates against the spool, the washer against one plate, the flanged brake-disk against the other, the plate G having been previously swung up out of the way, as shown in dotted lines, Fig. 2, the shaft is placed in its bearings and said plates are swung down over the same, the ratchet-wheel and crank are placed upon the end of the shaft, and the brake-strap put into place.

When wire is to be unwound from the spool, the spring-pawl is lifted from engagement with the ratchet-wheel, and the brake-strap will prevent the shaft and spool from revolving too fast in unwinding the wire; and if wire is to be wound upon the spool the pawl is allowed to engage with the ratchet-wheel and the shaft is revolved by the crank, the pawl and ratchet-wheel preventing the shaft from revolving in the direction opposite to which the shaft is turned by the crank, preventing the weight of the wire and the strain of the same from unwinding the wire from the spool.

When the machine is used as a wire-tightener, the machine is placed securely in position and the chain is secured to the frame and to a post, and the wire is secured to the spool or shaft, when, by revolving the same by means of the crank, the wire will be stretched.

Having thus described my invention, I claim and desire to secure by Letters Patent of the United States—

In a machine for winding and unwinding wire, the combination of a wheeled frame having uprights upon its side pieces inclined toward each other and secured together at their upper ends, having bearings at the upper ends of the forward pair of uprights, open at one side, pivoted bars or plates for closing the open sides of the bearings, a shaft having round ends fitting in the bearings and having a square central portion, and having a square end beyond one of the round ends, a common wire-spool fitting upon the shaft, plates having square central apertures fitting upon the shaft, and having inwardly-projecting lips upon the outer ends of the side edges engaging the edges of one cross-piece of each end piece of the spool, a washer having a square central perforation and interposed upon the shaft between the plate and one bearing, a flanged brake-disk interposed upon the shaft between a plate and the other bearing, a brake-strap secured at one end to the frame and passing over the disk and having a spiral spring at its other end drawing it down, a ratchet-wheel and crank having a central perforation fitting upon the square end of the shaft and secured by means of a pin or key through the end of the shaft, and a spring-pawl engaging the ratchet-wheel, as and for the purpose shown and set forth.

In testimony that I claim the foregoing as my own I have hereunto affixed my signature in presence of two witnesses.

JOHN HUFF CORCORAN.

Witnesses:
LOREN D. HILLS,
OLIVER S. CHAPPELL.